(12) United States Patent
Accardi

(10) Patent No.: US 9,248,817 B2
(45) Date of Patent: Feb. 2, 2016

(54) ANTI-ROLLAWAY DEVICE FOR TRUCKS AND EQUIPMENT WITH FLUID AND ELECTRICALLY ACTUATED BRAKES

(76) Inventor: Thomas Accardi, Medford, NY (US)

( * ) Notice: Subject to any disclaimer, the term of this patent is extended or adjusted under 35 U.S.C. 154(b) by 1949 days.

(21) Appl. No.: 12/359,539

(22) Filed: Jan. 26, 2009

(65) Prior Publication Data

US 2009/0160245 A1 Jun. 25, 2009

Related U.S. Application Data

(63) Continuation-in-part of application No. PCT/US2007/074285, filed on Jul. 25, 2007.

(60) Provisional application No. 60/833,546, filed on Jul. 26, 2006.

(51) Int. Cl.
*F16D 65/14* (2006.01)
*B60T 15/04* (2006.01)
*B60T 7/12* (2006.01)

(52) U.S. Cl.
CPC *B60T 15/041* (2013.01); *B60T 7/12* (2013.01)

(58) Field of Classification Search
CPC ................................. B60T 15/041; B60T 7/12
USPC ..................................... 303/89, 7; 188/151 A
See application file for complete search history.

(56) References Cited

U.S. PATENT DOCUMENTS

| 3,487,451 A | * | 12/1969 | Fontaine | 303/19 |
| 3,500,946 A | * | 3/1970 | Boyajian | 180/273 |
| 4,116,296 A | * | 9/1978 | Pleier et al. | 180/273 |
| 4,572,319 A | | 2/1986 | Fontaine | |
| 5,706,909 A | | 1/1998 | Bevins et al. | |
| 5,839,304 A | | 11/1998 | Wills | |
| 6,139,118 A | * | 10/2000 | Hurst et al. | 303/7 |
| 6,179,390 B1 | * | 1/2001 | Guzorek et al. | 303/7 |
| 2002/0189882 A1 | | 12/2002 | Eberling et al. | |
| 2006/0290199 A1 | * | 12/2006 | Beck et al. | 303/7 |

FOREIGN PATENT DOCUMENTS

AU    2003200668 B2    9/2003

* cited by examiner

*Primary Examiner* — Xuan Lan Nguyen
(74) *Attorney, Agent, or Firm* — The Webb Law Firm

(57) ABSTRACT

A vehicle anti-rollaway device includes a first switch responsive to the presence and absence of an operator at a predetermined location in the vehicle for controlling the on/off state of parking brake of the vehicle in the form of either a servo controlled parking brake or a fluid controlled parking brake. The device can also include a speed control responsive to a speed of the vehicle for controlling the on/off state of the parking brake as a function of the speed of the vehicle. The device can also include a second switch operative for controlling the response of the parking brake to the state of the first switch.

30 Claims, 4 Drawing Sheets

ANTI-ROLLAWAY DEVICE FOR TRUCKS AND EQUIPMENT WITH FLUID AND ELECTRICALLY ACTUATED BRAKES

CROSS-REFERENCE TO RELATED APPLICATION

This application is a continuation-in-part of International Application No. PCT/US2007/074285, filed Jul. 25, 2007, which claims priority to U.S. Provisional Application No. 60/833,546, filed Jul. 26, 2006, both of which are incorporated herein by reference.

BACKGROUND OF THE INVENTION

1. Field of the Invention

The present invention relates to preventing inadvertent rollaway of vehicles having fluid, e.g., air or hydraulic, or electrically controlled parking brake(s).

2. Description of Related Art

Fluid actuated parking brake(s), such as air pressure controlled parking brake(s) and hydraulic parking brake(s), or electric parking brake(s) are well-known in the art. Vehicles including such brake(s) typically include a parking control valve or servo controlled brake(s) operating under the control of an actuation means, such as a lever, knob or switch, or a switch, respectively, typically disposed inside the operator compartment of the vehicle for controlling the supply of pressurized fluid, e.g., air or hydraulic fluid, or electrical energy to the brake(s) whereupon the brake(s) can be set to the fully "on" state in a manner known in the art.

It is not uncommon for operators of such vehicles to exit the vehicles without setting the parking brake. In many instances, failure to set the parking brake has resulted in the vehicle inadvertently moving without an operator being present, a so-called "rollaway" condition. In many instances of rollaway, it is not uncommon for such vehicles to collide with other vehicles, structures or individuals causing damage to property and equipment, with resulting workmen's compensation claims and/or personal injury claims involving serious injury and/or death.

It would, therefore, be desirable to provide an anti-rollaway device that avoids inadvertent rollaway of vehicles having fluid or electric controlled parking brake(s).

SUMMARY OF THE INVENTION

An embodiment of a vehicle anti-rollaway device includes a source of electrical power; means responsive to the provision and withholding of electrical power from the source of electrical power for controlling the operation of a parking brake of the vehicle as a function thereof; and means responsive to the presence and absence of a vehicle operator at a predetermined location in the vehicle for controlling said provision and withholding of electrical power from the means for controlling.

The device can further include means responsive to a change in pressurized fluid supplied to a service brake of the vehicle for controlling the operation of the means for controlling the operation of the parking brake.

The device can further include means responsive to the activation of the parking brake by the means for controlling the operation of a parking brake for recording one or more of the following: a time of activation of the parking brake, a date of activation of the parking brake, or a geographic location of the vehicle when activation of the parking brake occurred.

The means for controlling the operation of the parking brake can include a parking control valve operatively coupled between a source of pressurized fluid and the parking brake in the form of a fluid controlled parking brake, said parking control valve operative for providing and withholding pressurized fluid from the parking brake in response to a state of an actuation means.

The parking control valve can be either mechanically or electrically actuated. The actuation means can include either: (1) a knob or lever operative for mechanically controlling a state of the parking control valve, in the form of a mechanically actuated parking control valve, to provide or withhold pressurized fluid from the parking brake of the vehicle; or (2) a parking control switch operatively coupled to the parking control valve, in the form of an electrically actuated parking control valve, for controlling the state of the parking control valve to provide or withhold pressurized fluid from the parking brake of the vehicle.

The means for controlling the operation of the parking brake further can include a solenoid valve operatively coupled to receive pressurized fluid from the source of pressurized fluid, said solenoid valve responsive to the provision and withholding of electrical power from the source of electrical power for controlling the provision of pressurized fluid to the parking brake.

The operation of the solenoid valve can be independent of the state of the actuation means.

The means for controlling the operation of the parking brake can further include a switch responsive to the parking control valve providing and withholding pressurized fluid to and from the parking brake for controlling the response of the solenoid valve to the provision of electrical power from the source of electrical power.

The means responsive to the presence and absence of a vehicle operator can include a switch responsive to the presence and absence of the vehicle operator on a seat of the vehicle. The means responsive to the presence and absence of a vehicle operator can further include a switch responsive to the presence and absence of at least one foot of the vehicle operator at a predetermined location in the vehicle.

The device can further include a speed sensor operative for outputting a signal indicative of the speed of the vehicle; and a speed control operatively coupled between the source of electrical power and the means for controlling the operation of a parking brake of the vehicle, said speed control responsive to the signal output by the speed sensor for providing and withholding electrical power to and from the means for controlling the operation of the parking brake of the vehicle.

The speed control can withhold electrical power from the means for controlling the operation of a parking brake of the vehicle when the signal output by the speed sensor indicates the vehicle is at or below a predetermined speed.

Another embodiment of a vehicle anti-rollaway device includes a parking control valve operative for controlling the supply of pressurized fluid to a parking brake of the vehicle; a speed sensor operative for outputting a speed signal corresponding to a speed of the vehicle; a speed control responsive to the speed signal for outputting a signal as a function of the speed sensor indicating the vehicle is at or below a predetermined speed; a solenoid valve responsive to the signal output by the speed control for controlling the supply of pressurized fluid to the parking control valve; a first switch operative for controlling the response of the solenoid valve to the signal output by the speed control as a function of the supply of pressurized fluid to the parking brake of the vehicle; and a second switch operative for controlling the response of the solenoid valve to the signal output by the speed control as a function of the presence of an operator at a predetermined location in the vehicle.

When (1) the speed control is outputting the signal, (2) the first switch is in a first state in response to the passage of pressurized fluid to the parking brake of the vehicle via the parking control valve and the solenoid valve, and (3) the second switch is in a first state in response to the presence of an operator at the predetermined location in the vehicle, in response to the operator leaving the predetermined location in the vehicle, the second switch changes state whereupon the solenoid valve becomes responsive to the signal output by the speed control for terminating the supply of pressurized fluid to the parking brake of the vehicle.

The device can include a third switch operative for controlling the response of the solenoid valve to the signal output by the speed control as a function of a change in a fluid pressure supplied to a service brake of the vehicle.

When (1) the speed control is outputting the signal, (2) the first switch is in a first state in response to the passage of pressurized fluid to the parking brake of the vehicle via the parking control valve and the solenoid valve, and (3) the second switch is in a first state in response to the operator being absent from the predetermined location in the vehicle, in response to a predetermined change in the fluid pressure supplied to the service brake of the vehicle, the third switch can change state whereupon the solenoid valve becomes responsive to the signal output by the speed control for terminating the supply of pressurized fluid to the parking brake of the vehicle.

Another embodiment of a vehicle anti-rollaway device for use on a vehicle equipped with a parking control valve operative for controlling the supply of pressurized fluid to a parking brake of the vehicle includes a speed control operative for outputting a signal when the speed of the vehicle is at or below a predetermined speed; a solenoid valve responsive to the signal output by the speed control for controlling the supply of pressurized fluid to the parking brake of the vehicle; and a first switch operative for controlling the response of the solenoid valve to the signal output by the speed control as a function of the presence and absence of an operator at a predetermined location in the vehicle, wherein, in response to the operator moving from the predetermined location in the vehicle when pressurized fluid is being supplied to the parking brake of the vehicle via the solenoid valve and the parking control valve, the first switch changes state whereupon the solenoid valve terminates the supply of pressurized fluid to the parking brake of the vehicle.

The device can further include a second switch for controlling the response of the solenoid valve to the signal output by the speed control as a function of a supply of pressurized fluid to a service brake of the vehicle, wherein in response to the supply and absence of the pressurized fluid to the service brake of the vehicle, the second switch causes the solenoid valve to be respectively not responsive and responsive, or vice versa, to the signal output by the speed control.

The device can further include a second, fluid-pressure controlled switch operative for controlling the response of the solenoid valve to the signal output by the speed control as a function of the supply of pressurized fluid to the parking brake of the vehicle, wherein in response to the supply and absence of pressurized fluid being supplied to the parking brake of the vehicle, the second switch causes the solenoid valve to be responsive and not responsive, or vice versa, to the signal output by the speed control.

The first switch, the second switch and a control input of the solenoid valve can be connected in series with the signal output by the speed control. The solenoid valve can be responsive to the signal output by the speed control received at the control input of the solenoid valve for controlling the flow of pressurized fluid to the parking brake of the vehicle.

Another embodiment of a vehicle anti-rollaway device includes a valve operatively coupled between a source of pressurized fluid and a fluid actuated parking brake of the vehicle; and a first switch responsive to the presence and absence of an operator at a predetermined location in the vehicle for controlling the state of the valve to supply or withhold pressurized fluid to the parking brake of the vehicle.

The device can further include a second switch responsive to the supply of pressurized fluid to a service brake of the vehicle for controlling the response of the valve to the state of the first switch.

The device can further include a speed control responsive to a speed of the vehicle for controlling the response of the valve to the state of the first switch.

The device can further include a second switch responsive to the supply of pressurized fluid to the parking brake for controlling the response of the valve to the state of the first switch.

Another embodiment of a vehicle anti-rollaway device includes a first switch responsive to the presence and absence of an operator at a predetermined location in the vehicle for controlling the on/off state of a parking brake of the vehicle.

The device can further include a second switch responsive to the supply of pressurized fluid to a service brake of the vehicle for controlling the response of the parking brake to the state of the first switch.

The parking brake can be either a servo controlled parking brake or a fluid controlled parking brake.

The device can further include a speed control operative for controlling the on/off state of the parking brake as a function of the speed of the vehicle.

The device can further include a second switch operative for controlling the response of the parking brake to the state of the first switch.

DETAILED DESCRIPTION OF THE INVENTION

Embodiments of the invention will now be described with reference to the accompanying figures where like reference numbers correspond to like elements.

Figure 1:
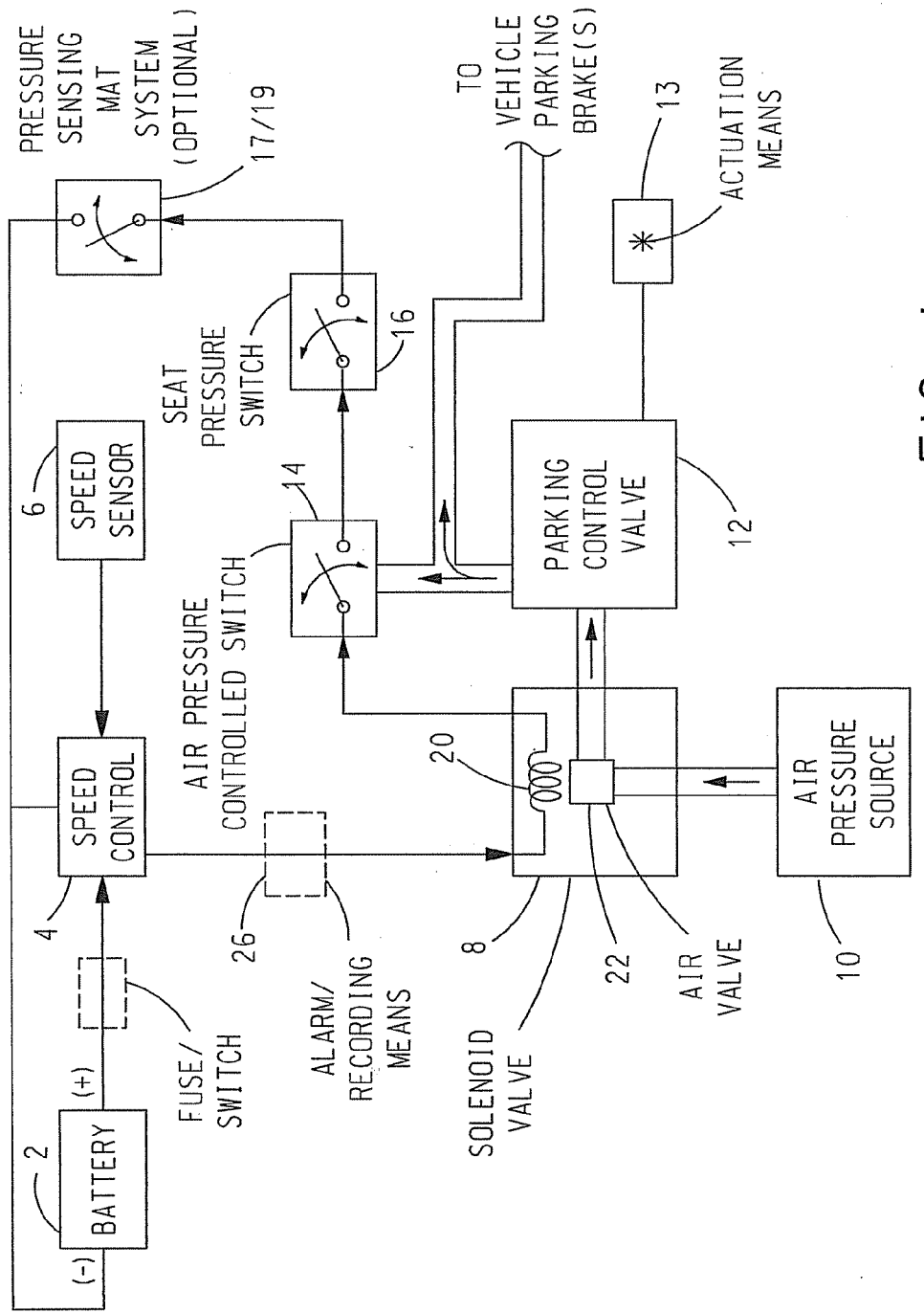
FIGS. 1-4 are schematic drawings showing different embodiments of the vehicle anti-rollaway devices described herein.

With reference to FIG. 1, one embodiment of an anti-rollaway device includes a speed control 4 having a power input coupled to the positive terminal of a battery 2 and a speed sensor input coupled to the output of a speed sensor 6.

Speed control 4 can be any suitable and/or desirable speed control. One exemplary, non-limiting example of a suitable speed control 4 is available from Hewitt Industries of 5492 Bulsa Avenue, Huntington Beach, Calif. 92649, part number 030-310 or 030-317. However, the use of this particular speed control is not to be construed as limiting the invention since it is envisioned that any other suitable and/or desirable speed control that can perform the functions of speed control 4 described hereinafter can be utilized.

Speed sensor 6 can be any suitable and/or desirable speed sensor, such as a vehicle speedometer or a magnetic sensor configured to detect rotation of a flywheel, drive shaft or tire (not shown) of the vehicle. However, this is not to be construed as limiting the invention since it is envisioned that any suitable and/or desirable speed sensor that is capable of outputting a signal indicative of movement of the vehicle is envisioned.

A solenoid valve 8 has a solenoid coil 20 operatively positioned adjacent an air valve 22 of solenoid valve 8. In operation, in response to solenoid coil 20 not being energized with electrical power supplied by battery 2 via speed control 4, air valve 22 permits the passage of pressurized air from an air pressure source 10 of the vehicle to a parking control valve 12 of the vehicle. Conversely, in response to solenoid coil 20 being energized with electrical power, air valve 22 blocks the passage of pressurized air from air pressure source 10 to parking control valve 12.

Parking control valve 12 is of the conventional type that is operative for supplying or terminating the supply of pressurized air to one or more parking brake(s) of the vehicle in response to actuation or de-actuation of a suitable actuation means 13 typically disposed within a driver's compartment of the vehicle. For example, by way of actuation means 13, such as a knob, lever or switch, parking control valve 12 can be set to withhold pressurized air from the vehicle parking brake(s), whereupon said parking brake(s) will be set to their fully "on" or engaged state in a manner known in the art.

The output of parking control valve 12 utilized to supply pressurized air to the vehicle parking brake(s) is also coupled to an air pressure controlled switch 14 that is electrically connected between solenoid coil 20 of solenoid valve 8 and a seat pressure switch 16.

Air pressure controlled switch 14 is operative for electrically connecting solenoid coil 20 to seat pressure switch 16 in response to the output of pressurized air from parking control valve 12. In response to the absence of pressurized air output by parking control valve 12, air pressure controlled switch 14 will be in its open state whereupon no electrical connection exists between solenoid coil 20 and seat pressure switch 16. In operation, air pressure controlled switch 14 prevents solenoid coil 20 from drawing electrical power when the vehicle parking brake(s) are set to their "on" position in response to the actuation of parking control valve 12 to block the passage of pressurized air to the vehicle parking brake(s). Conversely, if pressurized air is output by parking control valve 12 to the vehicle parking brake(s), air pressure controlled switch 14 will be in its closed state whereupon when seat pressure switch 16 is in its closed state, solenoid coil 20 will be energized.

Seat pressure switch 16 is disposed such that when an operator of the vehicle sits in the driver's seat of the vehicle, seat pressure switch 16 will be in its open state. In contrast, when the operator is not sitting in the driver's seat, seat pressure switch 16 will be in its closed state.

The operation of the embodiment of the anti-rollaway device of FIG. 1, without the optional pressure sensing mat system 17 shown in FIG. 1 and described hereinafter, will now be described.

In operation of the vehicle with the operator sitting on the driver's seat and the parking control valve 12 set to pass pressurized air to air pressure controlled switch 14 and the vehicle parking brake(s), seat pressure switch 16 will be in its open state and air pressure controlled switch 14 will be in its closed state.

In the event the operator leaves the driver's seat when parking control valve 12 is passing pressurized air to air pressure controlled switch 14 and to the vehicle parking brake(s), seat pressure switch 16 will move to its closed state whereupon electrical power is provided by battery 2 to solenoid coil 20 via speed control 4, air pressure controlled switch 14, and seat pressure switch 16. In response to energizing solenoid coil 20 with electrical power, air valve 22 terminates the supply of pressurized air from air pressure source 10 to parking control valve 12 whereupon the supply of pressurized air to air pressure controlled switch 14 and to the vehicle parking brake(s) is terminated. In response to termination of pressurized air thereto, the vehicle parking brake(s) are set to their fully "on" state.

Thus, if the vehicle parking brake(s) are not set to their fully "on" state by operation of the parking control valve, and the weight of the vehicle operator is not on the driver's seat, the vehicle parking brake(s) will be set to their fully "on" state as a result of the energization of solenoid coil 20 and the resultant termination of pressurized air to parking control valve 12 by air valve 22. If desired, solenoid valve 8 can be a time delay solenoid valve whereupon the operation of air valve 22 to terminate the supply of pressurized air to parking control valve 12 is delayed for a predetermined or user settable period after solenoid coil 20 is energized. This delay helps avoid the inadvertent actuation of the vehicle parking brake(s). Speed control 4 also avoids the accidental activation of the vehicle parking brake(s) during normal vehicle operation in a manner to be described hereinafter.

If the vehicle parking brake(s) are set to their fully "on" state by way of parking control valve 12 terminating the supply of pressurized air to the vehicle parking brake(s) and to air pressure controlled switch 14, air pressure controlled switch 14 will be in its open state, thereby preventing solenoid coil 20 from being energized and unnecessarily draining battery power when the vehicle parking brake(s) are already set to their fully "on" state.

Parking control valve 12 includes a mechanical interlock that prevents it from passing pressurized air to air pressure controlled switch 14 and the vehicle parking brake(s) after the supply of pressurized air to parking control valve 12 has been terminated unless activation means 13 is manipulated by the operator in a suitable manner. Thus, when the supply of pressurized air to parking control valve 12 is terminated in response to energizing solenoid coil 20, whereupon pressurized air to air pressure controlled switch 14 is terminated and air pressure controlled switch 14 opens, the mechanical interlock of parking control valve 12 prevents the subsequent passage of pressurized air to air pressure controlled switch 14 when solenoid valve 20 deenergizes (in response to air pressure controlled switch 14 opening). This mechanical interlock avoids the uncontrolled on/off operation of the vehicle parking brake(s) that would otherwise be caused by the open/closed operation of air pressure controlled switch 14 in response to energization/de-energization of solenoid valve 20 when seat pressure switch is in its closed state.

To avoid the inadvertent supply of electrical power to solenoid coil 20 when the vehicle is in use above a predetermined speed, speed control 4 is operative for sensing the output of speed sensor 6 which outputs a suitable signal indicative of the vehicle in motion. When the vehicle is in motion above a predetermined speed and speed sensor 6 is outputting a signal indicative thereof to speed control 4, speed control 4 is operative for terminating or withholding the supply of electrical power to solenoid coil 20 from battery 2 in order to avoid inadvertent operation of solenoid valve 22 and, hence, the vehicle parking brake(s). Desirably, in response to the vehicle coming to a stop, speed sensor 6 outputs a corresponding signal to speed control 4 which is operative in response thereto for coupling solenoid coil 20 to battery 2 whereupon the supply of electrical power to solenoid coil 20 is controlled by air pressure controlled switch 14 and/or seat pressure control switch 16 in the manner described above.

In the foregoing description, parking control valve 12 was considered to be a mechanically actuated parking control valve 12. However, this is not to be construed as limiting the invention.

Optionally, a pressure sensing mat system 17 can be provided that includes a pressure sensing mat 19 disposed on the floor of the vehicle. Pressure sensing mat system 17 is operative such that when an operator sits in the drivers seat of the vehicle with one or both of the operator's feet on pressure sensing mat 19, the output of pressure sensing mat system 17 will be in its open state. When one or both feet of the operator are not on pressure sensing mat 19, pressure sensing mat system 17 will be in its closed state.

Pressure sensing mat system 17 can include any suitable and/or desirable pressure sensing mat 19, such as, without limitation, a Tapeswitch® Sensing Mat distributed by Tapeswitch Ltd., Unit 38, Drumhead Road, Chorley North Industrial Park, Chorley, Lancashire, United Kingdom. As the switching logic of a conventional pressure sensing mat is opposite to the logic needed for pressure sensing mat system 17, it is envisioned that the logical output of pressure sensing mat 19 will be inverted by a suitable inverting means, e.g., by a second, external switch or a suitable logic inverting circuit connected to the switching function of pressure sensing mat 19 in a suitable manner. Thus, in normal operation of pressure sensing mat 19 without the suitable inverting means, the output (or switching function) of pressure sensing mat 19 will be in its closed state when one or both feet of the operator are disposed on pressure sensing mat 19 and will be in its open state when the feet of the driver are not disposed on pressure sensing mat 19. In contrast, with the use of the suitable inverting means, pressure sensing mat system 17 will invert this logic so that the output (or switching function) of pressure sensing mat system 17 will be in its open state when one or both feet of the operator are disposed on pressure sensing mat 19 and will be in a closed state when the feet of the driver are not disposed on pressure sensing mat 19.

For the purpose of simplicity and illustration, the function of pressure sensing mat system 17 is shown in FIG. 1 as a switch. However, it is to be appreciated that pressure sensing mat system 17 includes not only pressure sensing mat 19 but also includes the suitable inverting means for inverting the logic function of a pressure sensing mat 19. Nevertheless, it is envisioned that if a pressure sensing mat were available that could provide the proper logic switching function, namely, an open state when one or both feet of the operator are on such pressure sensing mat and a closed state when one or both feet of the operator are not on such pressure sensing mat, then such pressure sensing mat would comprise the entirety of pressure sensing mat system 17.

As shown in FIG. 1, the switching function of pressure sensing mat system 17 is in series with the switching functions of air pressure controlled switch 14 and seat pressure switch 16. The operation of the embodiment of the anti-rollaway device of FIG. 1 with the optional pressure sensing mat system 17 being utilized in combination with seat pressure switch 16 will now be described.

In operation of the vehicle with the operator sitting on the drivers seat with one or both of the operator's feet on pressure sensing mat 19 of pressure sensing mat system 17 and with the parking control valve 12 set to pass pressurized air to air pressure controlled switch 14 and the vehicle parking brake(s), seat pressure switch 16 will be in its open state, the switching function provided by pressure sensing mat system 17 will be in its open state, and air pressure controlled switch 14 will be in its closed state.

In the event the operator leaves the driver's seat and the feet of the operator leave pressure sensing mat 19 of pressure sensing mat system 17 when air pressure controlled switch 14 is in its closed state, seat pressure switch 16 will move to its closed state and the switching function of pressure sensing mat system 17 will move to its closed state whereupon electrical power is provided by battery 2 to solenoid coil 20 via speed control 4, air pressure controlled switch 14, seat pressure switch 16, and the switching function of pressure sensing mat system 17. In response to energizing solenoid coil 20 with electrical power, air valve 22 terminates the supply of pressurized air from air pressure source 10 to parking control valve 12, air pressure controlled switch 14 and the vehicle parking brake(s). In response to termination of pressurized air thereto, air pressure controlled switch 14 moves to its open state and the vehicle parking brake(s) set to their fully "on" state.

It is to be appreciated that if the operator's feet leave pressure sensing mat 19 of pressure sensing mat system 17 while the operator is sitting on the driver's seat, or if the driver leaves the driver's seat while one or both of the driver's feet are still on pressure sensing mat 19 of pressure sensing mat system 17, electrical power will be withheld from solenoid coil 20 whereupon the vehicle parking brake(s) will not be set to their fully "on" state. It is only when the feet of the operator leave the pressure sensing mat of pressure sensing mat system 17 and the operator leaves the driver's seat that electrical power will be provided to solenoid coil 20 whereupon the vehicle parking brake(s) are set to their fully "on" state.

Figure 2:
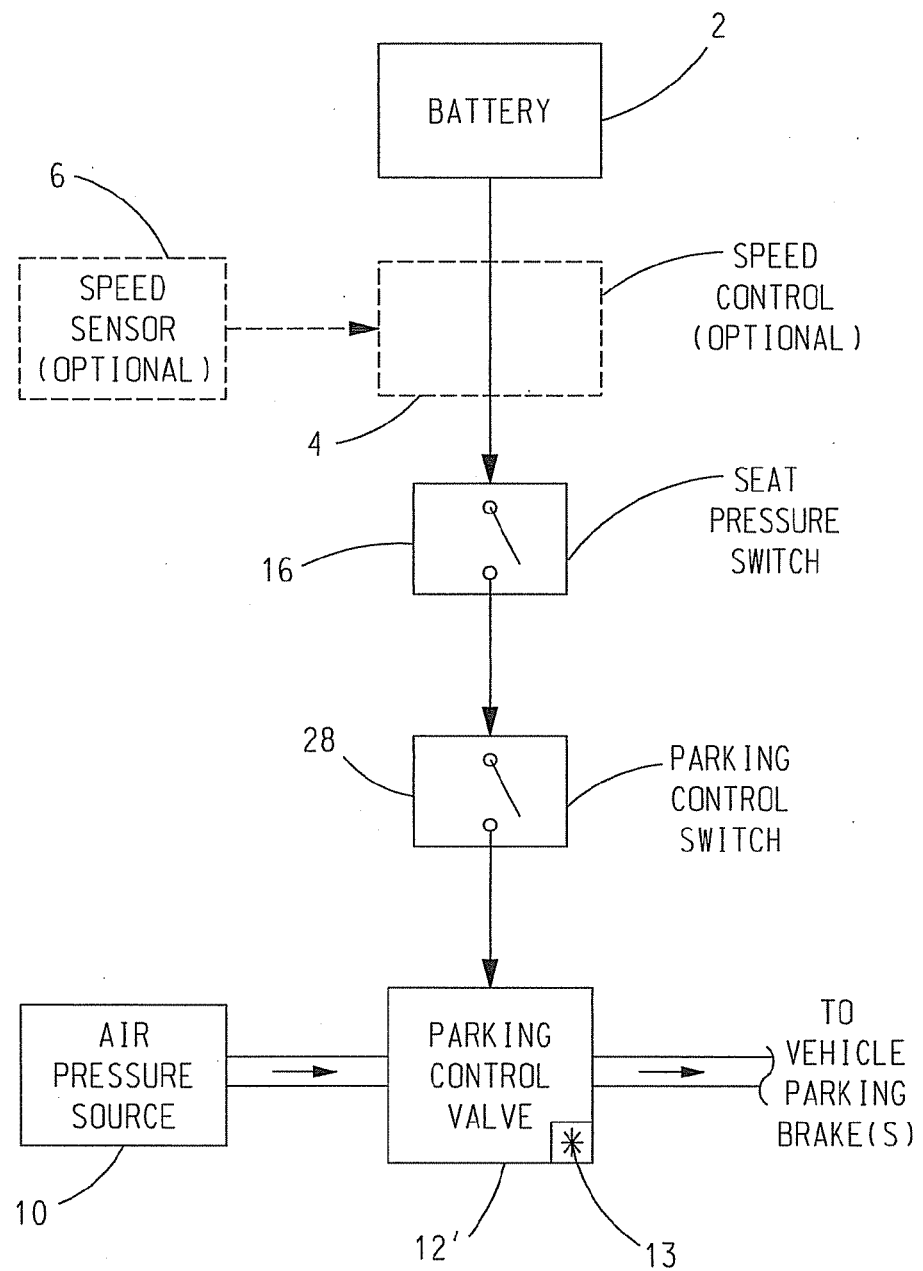

With reference to the accompanying FIG. 2, another embodiment of an anti-rollaway device includes battery 2 coupled to supply electrical power to an electrically actuated parking control valve 12' via seat pressure switch 16 and a parking control switch 28.

Parking control valve 12' is operative for supplying or terminating the supply of pressurized air from air pressure source 10 to one or more brake(s) of the vehicle in response to energization or de-energization, respectively, with electrical energy from battery 2.

The operation of the embodiment of the anti-rollaway device of FIG. 2 will now be described.

In normal operation of the vehicle, in order to set the vehicle parking brake(s) to the fully "on" state, parking control switch is set to its open state whereupon the supply of electrical power from battery 2 to parking control valve 12' is withheld. In response, parking control valve 12 withholds the passage of pressurized air from air pressure source 10 to the vehicle parking brake(s). When it is desired to operate the vehicle, parking control switch 28 is set to its closed state and seat pressure switch 16 is set to its closed state in response to the operator sitting on the driver's seat. The setting of seat pressure switch 16 and parking control switch 28 to their closed states enables parking control valve 12 to be energized with electrical power from battery 2. In response, parking control valve 12' permits pressurized air from air pressure source 10 to pass to the vehicle parking brake(s). In response, the vehicle parking brake(s) are set to their fully "off" state.

In the event the operator leaves the driver's seat when parking control valve 12' is passing pressurized air to the vehicle parking brake(s), seat pressure switch 16 will move to its open state whereupon the supply of electrical power to parking control valve 12' from battery 2 is terminated. In response, parking control valve 12' terminates the supply of pressurized air to the vehicle parking brake(s).

If desired, speed control 4, (shown in phantom in FIG. 2) can be coupled in series between parking control valve 12' and battery 2. In the embodiment of the anti-rollaway device of FIG. 2, speed control 4 is operative for sensing the output of speed sensor 6 which outputs a suitable signal indicative of the vehicle in motion. When the vehicle is in motion above a predetermined speed and speed sensor 6 is outputting a signal indicative thereof to speed control 4, speed control 4 is operative for terminating or withholding the supply of electrical power to parking control valve 12' from battery 2 in order to avoid inadvertent operation of parking control valve 12' and, hence, the vehicle parking brake(s), when the vehicle is in motion.

Desirably, in response to the vehicle coming to a stop, speed sensor 6 outputs a corresponding signal to speed control 4 which is operative in response thereto for passing power from battery 2 to parking control valve 12' when switches 16 and 28 are in their closed states.

While parking control valve 12' has been described as being operative for supplying or terminating the supply of pressurized air to one or more brake(s) of the vehicle in response to energization or de-energization, respectively, with electrical energy, it is envisioned that parking control valve 12' can also or alternatively be operative for supplying or terminating the supply of pressurized air to one or more brake(s) of the vehicle in response to de-energization or energization, respectively, with electrical power from battery 2. In this case, the various open and closed states of switches 16 and 28 in the foregoing description of the embodiment shown in FIG. 2 would be reversed, as would the operation of speed control for providing or withholding the supply of electrical power to parking control valve 12' when the vehicle is above or below the predetermined speed.

It is envisioned that the embodiment of the anti-rollaway device shown in FIG. 2 can also include the switching function of pressure sensing mat system 17 in series with seat pressure switch 16. Inasmuch as the operation of the series combination of the switching function of pressure sensing mat system 17 and seat pressure switch 16 in the embodiment of the anti-rollaway device shown in FIG. 2 will be same as the operation of the series combination of the switching function of pressure sensing mat system 17 and seat pressure switch 16 in the embodiment of the anti-rollaway device shown in FIG. 1 and described above, a detailed description of the operation of the series combination of the switching function of pressure sensing mat system 17 and seat pressure switch 16 in the embodiment of the anti-rollaway device shown in FIG. 2 will not be presented to avoid unnecessary redundancy.

Figure 3:
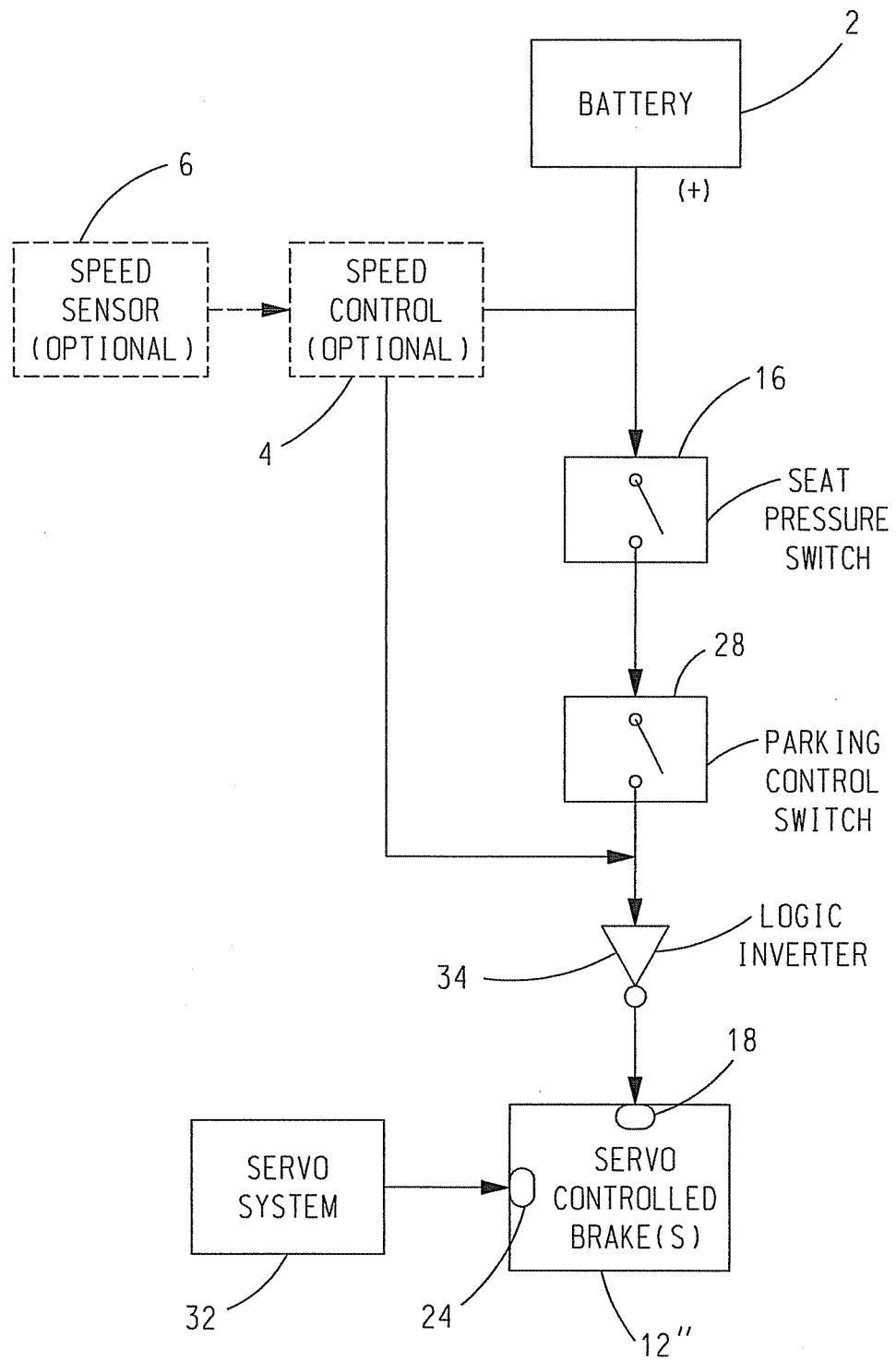

With reference to the accompanying FIG. 3, yet another embodiment of an anti-rollaway device includes battery 2 operative for supplying a positive voltage to an input of a logic inverter 34 via the series combination of parking control switch 28 and seat pressure switch 16. In this embodiment, servo controlled brake(s) 12" are set to the fully "on" or engaged state in response to a parking control input 18 thereof being energized with a sufficiently high positive voltage from the output of inverter 34. Conversely, servo controlled brake(s) 12" are set to the fully "off" or disengaged state in response to parking control input 18 being coupled to a sufficiently low voltage, e.g., near zero volts or ground, from the output of inverter 34. When set to the fully "off" state, servo controlled brake(s) 12" are operative under the control of a servo system 32 which is responsive to movement of a lever or pedal in the operator's compartment of the vehicle to provide a corresponding braking signal to an operational control input 24 of servo controlled brake(s) 12" to control the extent of actuation thereof as a function of the extent of actuation of the lever or pedal.

The operation of the embodiment of the anti-rollaway device of FIG. 3 will now be described.

When it is desired to set servo controlled brake(s) 12" to the fully "on" state, parking control switch 28 is set to its open state whereupon the electrical connection between battery 2 and the input of inverter 34 is terminated. In response, inverter 34 outputs a suitable positive voltage, e.g., positive battery voltage, to input 18 of servo controlled brake(s) 12". In response, servo controlled brake(s) 12" assume the fully "on" state.

Seat pressure switch 16 is operative for being in its closed state when the operator is sitting on the driver's seat and for being in its open state when the operator is not sitting on the driver's seat. In the event the operator leaves the driver's seat when parking control switch 28 is set to its closed state, i.e., the "off" state of servo controlled brake(s) 12", seat pressure switch 16 will move to its open state whereupon the electrical connection between inverter 34 and battery 2 is terminated. In response, inverter 34 outputs a suitable positive voltage, e.g., positive battery voltage, sufficient to cause servo controlled brake(s) 12" to be set to the fully "on" state.

To ensure inverter 34 outputs a low voltage or ground to input 18 of servo controlled brake(s) 12" during normal driving operation of the vehicle, whereupon servo controlled brake(s) 12" are in the "off" state for control by servo system 32, speed control 4 (shown in phantom in FIG. 3) can be coupled in parallel with the series combination of seat pressure switch 16 and parking control switch 28. Like the embodiments discussed above, speed control 4 is operative for sensing the output of speed sensor 6 (shown in phantom) which outputs a suitable signal indicative of the vehicle in motion. When the vehicle is in motion above a predetermined speed and speed sensor 6 is outputting a signal indicative thereof to speed control 4, speed control 4 is operative for supplying a suitable positive voltage to the input of inverter 34, regardless of the state of seat pressure switch 16 and/or the state of parking control switch 28, whereupon inverter 34 outputs a low voltage to input 18 of servo controlled brake(s) 12", whereupon said brake(s) are set to the fully "off" state. As a result, inadvertent application of a suitable positive voltage by inverter 34 to input 18 of servo controlled brake(s) 12" and, hence, the setting of servo controlled brake(s) 12" to the fully "on" state, is avoided when the vehicle is in motion above the predetermined speed.

Desirably, in response to the vehicle coming to a stop, speed sensor 6 outputs a corresponding signal to speed control 4 which is operative in response thereto for terminating the output of a suitable positive voltage to the input of inverter 34 and for providing a high impedance output to the input of inverter 34. As a result of this high impedance output, the input of inverter 34 is responsive to the operation of switches 16 and 28 to control the supply of positive voltage to the input of inverter 34 from battery 2. For example, input 18 of servo controlled brake(s) 12" receives a low voltage or ground from inverter 34 in response to parking control switch 28 being in its closed state and seat pressure switch 16 being in its closed state in response to the driver sitting on the driver's seat. As a result of this low voltage, servo controlled brake(s) 12" are set to the fully "off" state. Conversely, when input 18 of servo controlled brake(s) 12" receives a suitable positive voltage from inverter 34 in response to either one or both of parking control switch 28 and seat pressure switch 16 being in its open state, servo controlled brake(s) 12" are set to their fully "on" state.

If the driver should leave the driver's seat when the vehicle is either stopped or moving below the predetermined speed where speed control 4 supplies a high impedance output to inverter 34 and the parking control switch is in its closed state, seat pressure switch 16 will move to its open state whereupon the positive voltage output by battery 2 to the input of inverter 32 is terminated and, in response thereto, inverter 34 outputs a suitable positive voltage to input 18 of servo controlled brake(s) 12", whereupon servo controlled brake(s) 12" assume their fully "on" state.

It is envisioned that the embodiment of the anti-rollaway device shown in FIG. 3 can also include the switching function of pressure sensing mat system 17 in series with seat pressure switch 16. Inasmuch as the operation of the series combination of the switching function of pressure sensing mat system 17 and seat pressure switch 16 in the embodiment of the anti-rollaway device shown in FIG. 3 will be same as the operation of the series combination of the switching function of pressure sensing mat system 17 and seat pressure switch 16 in the embodiment of the anti-rollaway device shown in FIG. 1 and described above, a detailed description of the operation of the series combination of the switching function of pressure sensing mat system 17 and seat pressure switch 16 in the embodiment of the anti-rollaway device shown in FIG. 3 will not be presented to avoid unnecessary redundancy.

Figure 4:
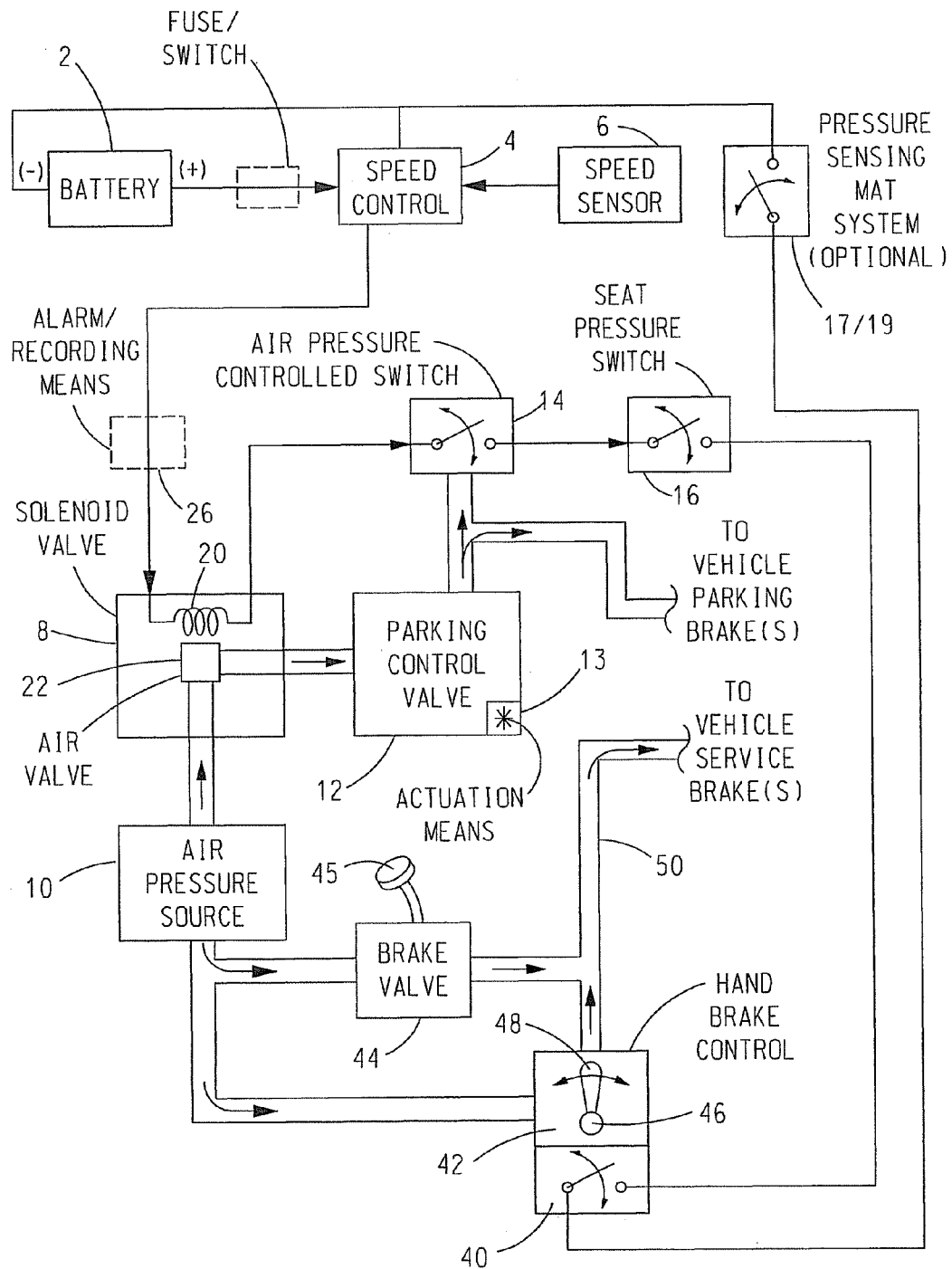

With reference to FIG. 4, another embodiment of an anti-rollaway device includes the various elements of the anti-rollaway device shown in FIG. 1 and further includes an optional handbrake control 42 that is connected in parallel with a conventional service brake valve 44 of the vehicle. Brake valve 44 operates in a manner known in the art to control the amount or pressure of pressurized air that is supplied to the service brake(s) of the vehicle from air pressure source 10 as a function of how far a brake pedal 45 of the vehicle is depressed. Specifically, when brake pedal 45 is not being depressed (i.e., brake pedal 45 is in its fully up position), brake valve 44 is closed whereupon pressurized air is withheld from the vehicle service brake(s) and the vehicle service brake(s) are set to their fully "off" state. In contrast, when brake pedal 45 is fully depressed, brake valve 44 is open whereupon pressurized air from air pressure source is provided to the vehicle service brake(s) and the vehicle service brake(s) are set to their fully "on" state. Activation of brake pedal 45, and hence brake valve 44, to a position intermediate its fully up position and its fully depressed position will result in the pressure of the pressurized air provided to the vehicle service brake(s) by brake valve 44 and, hence, the state of the vehicle service brake(s) being set intermediate their fully "off" state and their fully "on" state. As is well known in the art, the pressure of the pressurized air provided to the vehicle service brake(s) is related to the extent that brake pedal 45 is depressed.

Vehicles that service routes that require numerous stops are often equipped with a handbrake control 42 which enables the on/off state of the vehicle service brake(s) to be controlled independent of brake valve 44. Examples of such vehicles include garbage trucks and delivery vans. However, the invention is not to be construed as being limited so such vehicles as the invention can be utilized with any suitable and/or desirable vehicle that has pressure operated parking brake(s) and pressure operated service brake(s), e.g., without limitation, a tractor/trailer.

Handbrake control 42 includes a lever 48 operated hand valve 46. Handle 48 is disposed within easy reach of the operator, e.g., on the steering column of the vehicle. Hand valve 46 is connected in parallel with brake valve 44. When it is desired to operate the vehicle service brake(s) under the control of brake pedal 45 and brake valve 44, hand valve 46 is set via lever 48 to its closed state blocking the passage of pressurized air through hand valve 46. In contrast, when it is desired to utilize handbrake control 42 to set the vehicle service brake(s) to their fully "on" state, hand valve 46 is set via lever 48 to its open state which shunts pressurized air around brake valve 44 to the vehicle services brake(s) thereby setting the vehicle services brake(s) to their fully "on" state. Thus, when hand valve 46 is set to its closed state, the vehicle services brake(s) operate under the control of brake pedal 45 and brake valve 44 in a conventional manner. In contrast, when hand valve 46 is set to its open state, pressurized air is provided to the vehicle service brake(s) which sets the vehicle service brake(s) to their fully "on" state.

A problem with handbrake control 42 is that when hand valve 46 is in its fully open state, lever 45 and/or hand valve 46 is/are subject to inadvertent movement, e.g., due to vibration, wear, or the operator inadvertently moving lever 45, whereupon hand valve 46 moves from its fully open state to a fully or partially closed state, whereupon the pressure of pressurized air supplied to the vehicle service brake(s) is terminated or reduced. If the pressure of pressurized air supplied to the vehicle service brake(s) decreases sufficiently, the vehicle service brake(s) can partially or fully disengage from the fully "on" state, whereupon the vehicle can be subject to uncontrolled movement (rolling).

To avoid the problem of inadvertent movement of hand valve 46 from its fully open state to a fully or partially closed state, a pressure sensing switch 40, in the form of an on/off switch, is positioned in a fluid supply line 50 that connects brake valve 44 and hand valve 46 to the vehicle service brake(s). When the pressure of pressurized air in fluid supply line 50 is above a predetermined pressure, e.g., above 90 pound/square inch or 620.528 kPa, pressure sensing switch 40 will be in its open state. When the pressure of pressurized air in fluid supply line 50 drops below this predetermined pressure, pressure sensing switch 40 will be in its closed state.

The operation of the embodiment of the anti-rollaway device of FIG. 4, without optional pressure sensing mat system 17 shown in FIG. 4, will now be described.

In normal operation of the vehicle, parking control valve 12 is set to pass pressurized air to air pressure controlled switch 14 and the vehicle parking brakes, whereupon air pressure controlled switch 14 will be in its closed state and the vehicle parking brakes will be in their "off" state. Hand valve 46 is set to its closed state, whereupon pressure sensing switch 40 is in its closed state, and the operator sits on the driver's seat causing seat pressure switch 16 to be in its open state. Under these conditions, electrical power is withheld from solenoid coil 20 by the open state of seat pressure switch 16 and the service brake(s) of the vehicle are controlled by brake pedal 45 and brake valve 44 in a conventional manner. In the event the operator leaves the driver's seat under these conditions, seat pressure switch 16 will close whereupon solenoid coil 20 will receive electrical power from battery 2 thereby causing the vehicle parking brake(s) to move to their fully "on" state in the manner discussed above in connection with the embodiment shown in FIG. 1.

If, however, prior to leaving the driver's seat the operator moves lever 48 to a position that sets hand valve 46 to its fully open state, pressurized air supplied to the vehicle service brake(s) from air pressure source 10 via hand valve 46 sets the vehicle service brake(s) to their fully "on" state and sets pressure sensing switch 40 to its open state as a result of the constant supply of pressurized air above the predetermined pressure in fluid supply line 50. Thereafter, in response to the operator leaving the driver's seat, seat pressure switch 16 will move to its closed state. However, at this time, electrical power is withheld from solenoid coil 20 by virtue of pressure sensing switch 40 being in its open state.

In the event the operator is not on the driver's seat when hand valve 46 moves from its fully open state to a fully or partially closed state, whereupon the pressure in fluid supply line 50 decreases below the predetermined pressure and the vehicle service brake(s) fully or partially release from their fully "on" state, pressure sensing switch 40 will close thereby completing the circuit between solenoid coil 20 and the negative terminal of battery 2. Under these conditions, solenoid coil 20 will receive electrical power from battery 2 thereby causing the vehicle parking brake(s) to move to their fully "on" state in the manner discussed above in connection with the embodiment shown in FIG. 1.

When the vehicle parking brake(s) are set to their fully "on" state in response to solenoid coil 20 being energized with electrical power from battery 2, parking control valve 12 terminates the supply of pressurized air to air pressure controlled switch 14, whereupon air pressure controlled switch 14 will move to its open state thereby preventing solenoid coil 20 from being energized and unnecessarily draining battery power when the vehicle parking brake(s) are set to their fully "on" state.

As discussed above, parking control valve 12 includes a mechanical interlock that prevents parking control valve 12 from passing pressurized air to air pressure controlled switch 14 and the vehicle parking brake(s) absent manipulation of activation means 13 by a vehicle operator in a suitable manner. Thus, when the supply of pressurized air to parking control valve 12 is terminated in response to energizing solenoid coil 20 in the manner described above, when the pressure of the pressurized air to air pressure controlled switch 14 decreases to the point that air pressure controlled switch 14 opens, whereupon solenoid coil 20 is de-energized and air valve 22 once again permits pressurized air to flow to parking control valve 12, the mechanical interlock of parking control valve 12 prevents the passage of pressurized air to air pressured controlled switch 14, thus avoiding the uncontrolled on/off operation of the vehicle parking brake(s) as a result of the alternating supply and termination of pressurized air to air pressure controlled switch 14 in response to air valve 22 passing and not passing pressurized air to parking control valve 12.

The operation of the embodiment of the anti-rollaway device shown in FIG. 4 with air pressure controlled switch 14, seat pressure switch 16, pressure sensing switch 40, and optional pressure sensing mat system 17 will now be described.

Assume that the operator is sitting on the driver's seat with one or both feet of the operator on pressure sensing mat 19 of pressure sensing mat system 17 and with parking control valve 12 set to pass pressurized air to air pressure controlled switch 14. Under these conditions, seat pressure switch 16 will be in its open state, the switching function of pressure sensing mat system 17 will be in its open state, and air pressure controlled switch 14 will be in its closed state. Assume further that hand valve 46 of handbrake control 42 is in its closed state whereupon pressure sensing switch 40 is in its closed state. With switches 14, 16 and 40 and the switching function of pressure sensing mat system 17 in the foregoing states, the operation of the vehicle service brake(s) can be controlled by the operator via brake pedal 45 and brake valve 44 in a conventional manner.

Under these conditions, if the operator leaves the driver's seat and the feet of the operator leave the pressure sensing mat 19 of pressure sensing mat system 17, seat pressure switch 16 and the switching function of pressure sensing mat system 17 will move to their closed states whereupon electrical power will be provided to solenoid coil 20 via speed control 4, the closed state of air pressure controlled switch 14, the closed state of seat pressure switch 16, the closed state of the switching function of pressure sending mat system 17, and the closed state of pressure sensing switch 40. In response to energizing solenoid coil 20 with electrical power, air valve 22 terminates the supply of pressurized air to parking control valve 12 whereupon the supply of pressurized air to air pressure controlled switch 14 and to the vehicle parking brake(s) is terminated. In response to termination of pressurized air thereto, the vehicle parking brake(s) are set to their fully "on" state. The mechanical interlock of parking control valve 12 prevents the reintroduction of pressurized air to the vehicle parking brake(s) absent the operator manipulating activation means 13 in a suitable manner that enables parking control valve 12 to pass pressurized air to the vehicle parking brake(s) and to air pressure controlled switch 14.

Assume now that the operator of the vehicle moves hand valve 46 to its fully open state when the operator is sitting on the driver's seat and/or when one or both feet of the operator is/are on pressure sensing mat 19 of the pressure sensing mat system 17, and when parking control valve 12 is passing pressurized air to air pressure controlled switch 14 and to the vehicle parking brake(s). With hand valve 46 in its fully open state the vehicle service brake(s) are set to their fully "on" state and pressure sensing switch 40 is set to its open state by the pressurized air in fluid supply line 50. Under these conditions, pressure sensing switch 40, seat pressure switch 16 and the switching function of pressure sensing mat system 17 will be in their open states, and air pressure controlled switch 14 will be in its closed state. If the operator then leaves the driver's seat and the feet of the operator leave pressure sensing mat 19 of the pressure sensing mat system 17, seat pressure switch 16 and the switching function of pressure sensing mat system 17 will move to their closed states. However, since the vehicle service brake(s) are to their fully "on" state by the pressurized air in fluid supply line 50 and since pressure sensing switch 40 is set to its open state by the pressurized air in fluid supply line 50, automated activation of the vehicle parking brake(s) in the manner described above will not occur due to the open state of pressure sensing switch 40. Under these conditions, hand valve 46 passing pressurized air to the vehicle service brake(s) via fluid supply line 50 prevents inadvertent movement of the vehicle.

Under these conditions, in the event hand valve 46 moves from its fully open state to a fully or partially closed state the air pressure in fluid supply line 50 will drop and the vehicle service brake(s) will fully or partially release from their fully "on" state. Should the air pressure in fluid supply line 50 drop below the predetermined pressure, pressure sensing switch 40 to move from its open state to its closed state whereupon electrical power will be provided to solenoid coil 20 via speed control 4, the closed state of air pressure controlled switch 14, the closed state of seat pressure switch 16, the closed state of pressure sensing switch 40, and the closed state of the switching function of pressure sensing mat system 17. In response to energizing solenoid coil 20 with electrical power, air valve 22 terminates the supply of pressurized air to parking control valve 12 whereupon the supply of pressurized air to air pressure controlled switch 14 and to the vehicle parking brake(s) is terminated. In response to termination of pressurized air thereto, the vehicle parking brake(s) are set to their fully "on" state. The mechanical interlock of parking control valve 12 prevents parking control valve 12 from inadvertently passing pressurized air to air pressure controlled switch 14 and the vehicle parking brake(s) absent manipulation of activation means 13 by the operator of the vehicle. Thus, once the vehicle parking brake(s) are set to their fully "on" state in response to air valve 22 terminating the supply of pressurized air from air pressure source 10 to parking control valve 12, pressurized air can only be reintroduced to air pressure controlled switch 14 and to the vehicle parking brake(s) by operator manipulation of activation means 13, thus avoiding the inadvertent on/off operation of the vehicle parking brake(s) in the absence of such mechanical interlock.

As can be seen in the embodiment of the anti-rollaway device shown in FIG. 4, pressure sensing switch 40 enables the vehicle parking brake(s) to be set to their fully "on" state in response to the full or partial release of the vehicle service brake(s) resulting from a reduction in the pressure of the pressurized fluid supplied to the vehicle service brake(s) via hand valve 46.

While the embodiment of the anti-rollaway device shown in FIG. 4 has been described with reference to the use of pressure sensing switch 40, it is envisioned that any suitable and/or desirable sensing means which can sense the air pressure inside fluid supply line 50 above and below the predetermined pressure and which can perform the switching function of pressure sensing switch 40, and/or any suitable and/or desirable means that enables detection of the position of the open state or fully/partially-closed state of hand valve 46, either directly or via lever 48, and which can perform the switching function of pressure sensing switch 40 can also or alternatively be used.

While the embodiments described in connection with FIGS. 1, 2, and 4 have been described in connection with pressurized air, it is to be appreciated that these embodiments can alternatively utilize pressurized hydraulic fluid. Accordingly, the foregoing description of the embodiments utilizing pressurized air is not to be construed as limiting the invention.

Because the automated activation of the vehicle parking brake(s) in each of the forgoing embodiments of the anti-rollaway system involves an electrical signal (even just a pulse), it is envisioned that information regarding the event, such as the time, date, and geographic position of the event, can be recorded in any suitable and/or desirable manner, such as, without limitation, via an optional alarm/recording means 26 (shown in phantom in FIGS. 1 and 4) that can be connected to be energized when solenoid coil 20 is energized. Information regarding the event can then recovered from alarm/recording means 26, whereupon management can be alerted to accidents that were avoided that day and perhaps the need for additional driver training or in some cases mandatory safety education or even imposition of economic deterrents.

Alarm/recording means 26 can include suitable means known in the electronics, instrumentation, and process control industries (e.g. GPS, mobile telephone) for recording the activation of the anti-rollaway device and for associating such activation with a date, time, and geographic position of the vehicle when the activation occurred. Alarm/recording means 26 can further include wired means (e.g., a USB port) and/or wireless means (e.g., RF communication via a mobile telephone network or satellite network) for recovering such information at regular intervals and/or pre-determined times including, including but not limited to the time of occurrence of the activation of the anti-rollaway system. Alarm/recording means 26 can further include means for preventing tampering with or altering such information other than by well-defined established procedures external to the operation of the vehicle.

The alarm function of alarm/recording means 26 can be connected to be energized when solenoid coil 20 is energized whereupon said alarm function is activated when solenoid coil 20 is energized. The alarm function of alarm/recording means 26 can be an audible alarm and/or a visual alarm.

It is to be appreciated that the alarm function and recording function of alarm/recording means 26 can be provided independent of each other. Thus, the foregoing description of the alarm/recording means 26 as having a combined alarm function and recording function is not to be construed as limiting the invention.

The present invention has been described with reference to the preferred embodiments. Obvious modifications and alterations will occur to others upon reading and understanding the preceding detailed description. For example, if desired, any one or all of the foregoing embodiments of the anti-rollaway device can include a fuse or switch (shown in phantom in FIGS. 1 and 4) in series with the supply of battery power to the anti-rollaway device. Accordingly, if it is desired to disable the anti-rollaway device for any reason, e.g., towing of the vehicle, the fuse can be removed or the switch can be set to an open position whereupon the anti-rollaway device will not receive electrical power from battery 2. Moreover, the various logic conventions for the disclosed embodiments are not to be construed as limiting the invention since it is envisioned that any suitable and/or desirable logic convention that enables operation of the various disclosed embodiments is envisioned. The invention is intended to be construed as including all such modifications and alterations insofar as they come within the scope of the appended claims or the equivalents thereof.

The invention claimed is:

1. A vehicle anti-rollaway device comprising:
   a source of electrical power;
   means responsive to providing and withholding electrical power from the source of electrical power for controlling the operation of a fluid controlled parking brake of the vehicle as a function thereof; and
   means responsive to the presence and absence of a vehicle operator at a predetermined location in the vehicle for controlling said providing and withholding of electrical power from the means for controlling the operation of the fluid controlled parking brake, wherein:
   the means for controlling the operation of the fluid controlled parking brake includes a solenoid valve fluidly connected in series in a path of pressurized fluid that runs between a source of pressurized fluid and the fluid controlled parking brake, and a parking control valve fluidly connected in series in the path of pressurized fluid between the solenoid valve and the fluid controlled parking brake; and
   said solenoid valve is responsive to the providing and withholding of electrical power for respectively withholding and providing all pressurized fluid to the parking control valve.

2. The device of claim 1, further including means responsive to a change in pressurized fluid supplied to a fluid controlled service brake of the vehicle for controlling the operation of the means for controlling the operation of the fluid controlled parking brake.

3. The device of claim 1, wherein the means for controlling the operation of the fluid controlled parking brake includes a parking control valve operative for providing and withholding pressurized fluid from the fluid controlled parking brake in response to a state of an actuation means.

4. The device of claim 3, wherein:
   the parking control valve is either mechanically or electrically actuated; and
   the actuation means includes either: (1) a knob or lever operative for mechanically controlling a state of the parking control valve, in the form of a mechanically actuated parking control valve, to provide or withhold pressurized fluid from the fluid controlled parking brake of the vehicle; or (2) a parking control switch operatively coupled to the parking control valve, in the form of an electrically actuated parking control valve, for controlling the state of the parking control valve to provide or withhold pressurized fluid from the fluid controlled parking brake of the vehicle.

5. The device of claim 1, wherein the means for controlling the operation of the fluid controlled parking brake further includes a switch responsive to the providing and withholding of pressurized fluid to and from the parking control valve for controlling the response of the solenoid valve to the providing of electrical power from the source of electrical power.

6. The device of claim 1, wherein the means responsive to the presence and absence of a vehicle operator includes a switch responsive to the presence and absence of the vehicle operator on a seat of the vehicle.

7. The device of claim 6, wherein the means responsive to the presence and absence of a vehicle operator further includes a switch responsive to the presence and absence of at least one foot of the vehicle operator at a predetermined location in the vehicle.

8. The device of claim 1, further including:
a speed sensor operative for outputting a signal indicative of the speed of the vehicle; and
a speed control operatively coupled between the source of electrical power and the means for controlling the operation of the fluid controlled parking brake of the vehicle, said speed control responsive to the signal output by the speed sensor for providing and withholding electrical power to and from the means for controlling the operation of the fluid controlled parking brake of the vehicle.

9. The device of claim 8, wherein the speed control withholds electrical power from the means for controlling the operation of the fluid controlled parking brake of the vehicle when the signal output by the speed sensor indicates the vehicle is at or below a predetermined speed.

10. A vehicle anti-rollaway device comprising:
a parking control valve connected between a source of pressurized fluid and a fluid controlled parking brake of a vehicle, said parking control valve operative for controlling a supply of pressurized fluid from the source of pressurized fluid to the fluid controlled parking brake of the vehicle;
a speed sensor operative for outputting a speed signal corresponding to a speed of the vehicle;
a speed control responsive to the speed signal for outputting a signal as a function of the speed sensor indicating the vehicle is at or below a predetermined speed;
a solenoid valve fluidly connected in series between the source of pressurized fluid and the parking control valve whereupon pressurized fluid received by the parking control valve from the source of pressurized fluid for passage to the fluid controlled parking brake of the vehicle first passes through said solenoid valve, said solenoid valve responsive to the signal output by the speed control for terminating the supply of all pressurized fluid to the parking control valve;
a first switch operative for controlling the response of the solenoid valve to the signal output by the speed control as a function of the supply of pressurized fluid to the fluid controlled parking brake of the vehicle; and
a second switch operative for controlling the response of the solenoid valve to the signal output by the speed control as a function of the presence of an operator at least at one predetermined location in the vehicle.

11. The device of claim 10, wherein, when (1) the speed control is outputting the signal, (2) the first switch is in a first state in response to the passage of pressurized fluid to the fluid controlled parking brake of the vehicle via the parking control valve and the solenoid valve, and (3) the second switch is in a first state in response to the presence of an operator at the predetermined location in the vehicle, in response to the operator leaving the predetermined location in the vehicle, the second switch changes state whereupon the solenoid valve becomes responsive to the signal output by the speed control for terminating the supply of pressurized fluid to the fluid controlled parking brake of the vehicle.

12. The device of claim 10, further including a third switch operative for controlling the response of the solenoid valve to the signal output by the speed control as a function of a change in a fluid pressure supplied to a fluid controlled service brake of the vehicle.

13. The device of claim 12, wherein, when (1) the speed control is outputting the signal, (2) the first switch is in a first state in response to the passage of pressurized fluid to the fluid controlled parking brake of the vehicle via the parking control valve and the solenoid valve, and (3) the second switch is in a first state in response to the operator being absent from the predetermined location in the vehicle, in response to a predetermined change in the fluid pressure supplied to the fluid controlled service brake of the vehicle, the third switch changes state whereupon the solenoid valve becomes responsive to the signal output by the speed control for terminating the supply of pressurized fluid to the fluid controlled parking brake of the vehicle.

14. A vehicle anti-rollaway device for use on a vehicle equipped with a parking control valve operative for controlling the supply of pressurized fluid to a fluid controlled parking brake of the vehicle and a speed control operative for outputting a signal when the speed of the vehicle is at or below a predetermined speed, said device comprising:
a solenoid valve fluidly connected in series between a source of pressured fluid and the parking control valve, said solenoid valve responsive to the signal output by the speed control for controlling the supply of all pressurized fluid to the parking control valve; and
a first switch operative for controlling the response of the solenoid valve to the signal output by the speed control as a function of the presence and absence of an operator at a predetermined location in the vehicle, wherein, in response to the operator moving from the predetermined location in the vehicle when pressurized fluid is being supplied to the fluid controlled parking brake of the vehicle via the solenoid valve and the parking control valve, the first switch changes state whereupon the solenoid valve terminates the supply of all pressurized fluid to the parking control valve whereupon the fluid controlled parking brake assumes its on state.

15. The device of claim 14, further including a second switch for controlling the response of the solenoid valve to the signal output by the speed control as a function of a supply of pressurized fluid to a service brake of the vehicle, wherein in response to the supply and absence of the pressurized fluid to the service brake of the vehicle, the second switch causes the solenoid valve to be respectively not responsive and responsive, or vice versa, to the signal output by the speed control.

16. The device of claim 15, wherein:
the first switch, the second switch and a control input of the solenoid valve are connected in series with the signal output by the speed control; and the solenoid valve is responsive to the signal output by the speed control received at the control input of the solenoid valve for controlling the flow of pressurized fluid to the fluid controlled parking brake of the vehicle.

17. The device of claim 14, further including a second, fluid-pressure controlled switch operative for controlling the response of the solenoid valve to the signal output by the speed control as a function of the supply of pressurized fluid to the fluid controlled parking brake of the vehicle, wherein in response to the supply and absence of pressurized fluid to the fluid controlled parking brake of the vehicle, the second switch causes the solenoid valve to be respectively responsive and not responsive, or vice versa, to the signal output by the speed control.

18. The device of claim 17, wherein:
the first switch, the second switch and a control input of the solenoid valve are connected in series with the signal output by the speed control; and
the solenoid valve is responsive to the signal output by the speed control received at the control input of the solenoid valve for controlling the flow of pressurized fluid to the fluid controlled parking brake of the vehicle.

19. A vehicle anti-rollaway device comprising:
a solenoid valve operatively coupled between a source of pressurized fluid and a parking control valve that controls the state of a fluid actuated parking brake of the vehicle; and
a first switch responsive to the presence and absence of an operator at a predetermined location in the vehicle for controlling the state of the solenoid valve to respectively supply and withhold all pressurized fluid to the parking control valve, wherein the first switch assumes open and closed states in response to the respective presence and absence of the driver at a predetermined location in the vehicle.

20. The device of claim 19, further including a second third switch responsive to the supply of pressurized fluid to a service brake of the vehicle for controlling the response of the valve to the state of the first switch.

21. The device of claim 19, further including a speed control responsive to a speed of the vehicle for controlling the response of the solenoid valve to the state of the first switch.

22. The device of claim 19, further including a second switch responsive to the supply of all pressurized fluid to the parking control valve for controlling the response of the solenoid valve to the state of the first switch.

23. The device of claim 1, further including means responsive to the activation of the fluid controlled parking brake by the means for controlling the operation of a fluid controlled parking brake for recording one or more of the following: a time of activation of the fluid controlled parking brake, a date of activation of the fluid controlled parking brake, or a geographic location of the vehicle when activation of the fluid controlled parking brake occurred.

24. The device of claim 10, further including means responsive to the activation of the fluid controlled parking brake for recording one or more of the following: a time of activation of the fluid controlled parking brake, a date of activation of the fluid controlled parking brake, or a geographic location of the vehicle when activation of the fluid controlled parking brake occurred.

25. The device of claim 14, further including means responsive to the activation of the fluid controlled parking brake for recording one or more of the following: a time of activation of the fluid controlled parking brake, a date of activation of the fluid controlled parking brake, or a geographic location of the vehicle when activation of the fluid controlled parking brake occurred.

26. The device of claim 19, further including means responsive to a state of the first switch for recording one or more of the following: a time of activation of the fluid actuated parking brake, a date of activation of the fluid actuated parking brake, or a geographic location of the vehicle when activation of the fluid actuated parking brake occurred.

27. The device of claim 1, wherein the means responsive to the presence and absence of a vehicle operator includes a switch responsive to the presence and absence of at least one foot of the vehicle operator at a predetermined location in the vehicle.

28. The device of claim 10, wherein the at least one predetermined location is an operator's seat of the vehicle, a floor of the vehicle where at least one foot of the operator will be present during operation of the vehicle, or both.

29. The device of claim 14, wherein the predetermined location is an operator's seat of the vehicle or a floor of the vehicle where at least one foot of the operator will be present during operation of the vehicle.

30. The device of claim 19, wherein the predetermined location is an operator's seat of the vehicle or a floor of the vehicle where at least one foot of the operator will be present during operation of the vehicle.

* * * * *